US009420609B2

(12) United States Patent
Abe et al.

(10) Patent No.: US 9,420,609 B2
(45) Date of Patent: Aug. 16, 2016

(54) RADIO BASE STATION APPARATUS, MOBILE TERMINAL APPARATUS, RADIO COMMUNICATION SYSTEM AND RADIO COMMUNICATION METHOD

(75) Inventors: Tetsushi Abe, Tokyo (JP); Yoshihisa Kishiyama, Tokyo (JP); Satoshi Nagata, Tokyo (JP); Nobuhiko Miki, Tokyo (JP); Kazuaki Takeda, Tokyo (JP)

(73) Assignee: NTT DOCOMO, Inc., Tokyo (JP)

( * ) Notice: Subject to any disclaimer, the term of this patent is extended or adjusted under 35 U.S.C. 154(b) by 374 days.

(21) Appl. No.: 14/114,478

(22) PCT Filed: Feb. 17, 2012

(86) PCT No.: PCT/JP2012/053832
§ 371 (c)(1),
(2), (4) Date: Nov. 22, 2013

(87) PCT Pub. No.: WO2012/150667
PCT Pub. Date: Nov. 8, 2012

(65) Prior Publication Data
US 2014/0301286 A1 Oct. 9, 2014

(30) Foreign Application Priority Data

May 2, 2011 (JP) .................................. 2011-103223

(51) Int. Cl.
*H04W 74/04* (2009.01)
*H04W 72/04* (2009.01)
(Continued)

(52) U.S. Cl.
CPC ............. *H04W 74/04* (2013.01); *H04L 1/0027* (2013.01); *H04L 1/0031* (2013.01); *H04L 5/0053* (2013.01); *H04W 72/042* (2013.01);
(Continued)

(58) Field of Classification Search
CPC ...................................................... H04W 74/04
See application file for complete search history.

(56) References Cited

U.S. PATENT DOCUMENTS

2012/0039234 A1   2/2012   Hoshino et al.

FOREIGN PATENT DOCUMENTS

WO   2010/125794 A1   11/2010

OTHER PUBLICATIONS

Office Action in counterpart Japanese Patent Application No. JP2011-103223 dated Dec. 24, 2013 (5 pages).
(Continued)

*Primary Examiner* — Charles C Jiang
*Assistant Examiner* — Thad Defauw
(74) *Attorney, Agent, or Firm* — Osha Liang LLP

(57) ABSTRACT

The present invention is designed to provide a radio base station apparatus, a mobile terminal apparatus, a radio communication system and a radio communication method which can cope with an increased number of users. A radio base station apparatus is provided with: a signal generating section that generates a first downlink control signal and a second downlink control signal for a mobile terminal apparatus; a first multiplexing section that multiplexes the first downlink control signal on a control region up to a predetermined number of symbols from the top of a subframe; a second multiplexing section that frequency-division-multiplexes the second downlink control signal on radio resources from the next symbol in the control region to the last symbol of the subframe; and a transmission section that transmits the first downlink control signal multiplexed on the control region and the second downlink control signal multiplexed on the radio resources.

11 Claims, 14 Drawing Sheets

(51) Int. Cl.
*H04L 1/00* (2006.01)
*H04L 5/00* (2006.01)
*H04L 27/26* (2006.01)

(52) U.S. Cl.
CPC .............. *H04L 5/001* (2013.01); *H04L 5/0023* (2013.01); *H04L 27/2626* (2013.01); *H04L 27/2647* (2013.01)

(56) References Cited

OTHER PUBLICATIONS

Decision to Grant a Patent issued in related Japanese Application No. 2014-032585, mailed Jun. 2, 2015 (4 pages).
Decision to Grant a Patent in counterpart Japanese Patent Application No. 2011-103223, mailed Jul. 8, 2014 (4 pages).
International Search Report for corresponding International Application No. PCT/JP2012/053832, mailed May 22, 2012 (1 page).
3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9);" Dec. 2009 (18 pages).
NTT DOCOMO; "CoMP with Lower Tx Power RRH in Heterogeneous Network;" 3GPP TSG-RAN WG1 #64, R1-110867; Taipei, Taiwan; Feb. 21-25, 2011 (8 pages).
Office Action in corresponding Japanese Patent Application No. 2014-032585 mailed Nov. 18, 2014, with translation (5 pages).
Motorola, "PDCCH Design for Cross-Carrier Operation Using CIP", 3GPP TSG RAN WG1 Meeting #59; R1-094830; Jeju, Korea, Nov. 9, 2009 through Nov. 13, 2009; (3 pages).
Nortel Networks, "Control Channel Design for the Support of Wider Bandwidth for LTE-Advanced", TSG-RAN1 #55bis; R1-090157; Ljubljana, Slovenia, Jan. 12, 2009 through Jan. 16, 2009; (10 pages).

FIG. 6

RADIO BASE STATION APPARATUS, MOBILE TERMINAL APPARATUS, RADIO COMMUNICATION SYSTEM AND RADIO COMMUNICATION METHOD

TECHNICAL FIELD

The present invention relates to a radio base station apparatus, a mobile terminal apparatus, a radio communication system and a radio communication method in a next-generation radio communication system.

BACKGROUND ART

In the UMTS (Universal Mobile Telecommunications System) network, for the purposes of further increasing high-speed data rates, providing low delay and so on, long-term evolution (LTE) has been under study (see, for example, non-patent literature 1). In LTE, as multiple access schemes, a scheme that is based on OFDMA (Orthogonal Frequency Division Multiple Access) is used on the downlink, and a scheme that is based on SC-FDMA (Single Carrier Frequency Division Multiple Access) is used on the uplink.

Also, for the purpose of achieving further broadband and higher speed beyond LTE, a successor system of LTE has been under study. This successor system may be referred to as "LTE advanced" or "LTE enhancement" (hereinafter referred to as "LTE-A"). In LTE (Rel. 8) and LTE-A (Rel. 9 and Rel. 10), MIMO (Multi-Input Multi-Output) techniques to improve spectral efficiency by transmitting and receiving data by a plurality of antennas are under study as a radio communication technique. In the MIMO system, a plurality of transmitting/receiving antennas are provided in the transmitter/receiver, so that different transmission information sequences are transmitted from different transmitting antennas, at the same time.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in LTE-A, multiple-user MIMO (MU-MIMO) to transmit transmission information sequences to different users from different transmitting antennas at the same time is defined. This MU-MIMO transmission is also studied for application to a HetNet (Heterogeneous Network) and CoMP (Coordinated Multi-Point) transmission. Consequently, in future systems, the number of users to be connected to a base station apparatus is expected to increase, and there is a threat that the downlink control channel capacity runs short.

The present invention has been made in view of the above, and it is therefore an object of the present invention to provide a radio base station apparatus, a mobile terminal apparatus, a radio communication system and a radio communication method which expand a downlink control channel to increase its capacity and make it possible to multiplex more downlink control information (DCI).

Solution to Problem

A radio base station apparatus according to the present invention has: a signal generating section that generates a first downlink control signal and a second downlink control signal for a mobile terminal apparatus; a first multiplexing section that multiplexes the first downlink control signal on a control region up to a predetermined number of symbols from the top of a subframe; a second multiplexing section that frequency-division-multiplexes the second downlink control signal on radio resources from the next symbol in the control region to the last symbol of the subframe; and a transmission section that transmits the first downlink control signal multiplexed on the control region and the second downlink control signal multiplexed on the radio resources.

A mobile terminal apparatus according to the present invention has: a receiving section that receives a first downlink control signal that is multiplexed on a control region up to a predetermined number of symbols from the top of a subframe and a second downlink control signal that is frequency-division-multiplexed on radio resources from the next symbol in the control region to the last symbol of the subframe; a channel estimation section that performs channel estimation for the received first downlink control signal using a cell-specific reference signal, and performs channel estimation for the received second downlink control signal using the cell-specific reference signal or a user-specific reference signal; and a demodulation section that demodulates the first downlink control signal and the second downlink control signal using channel estimation results.

Advantageous Effects of Invention

According to the present invention, a downlink control channel is enhanced to increase its capacity, so that it is possible to multiplex more DCI.

BRIEF DESCRIPTION OF DRAWINGS

FIG. 6 is a diagram to explain an example of a search space when the enhanced PDCCH format is "without cross interleaving;"

DESCRIPTION OF EMBODIMENTS

Figure 1:
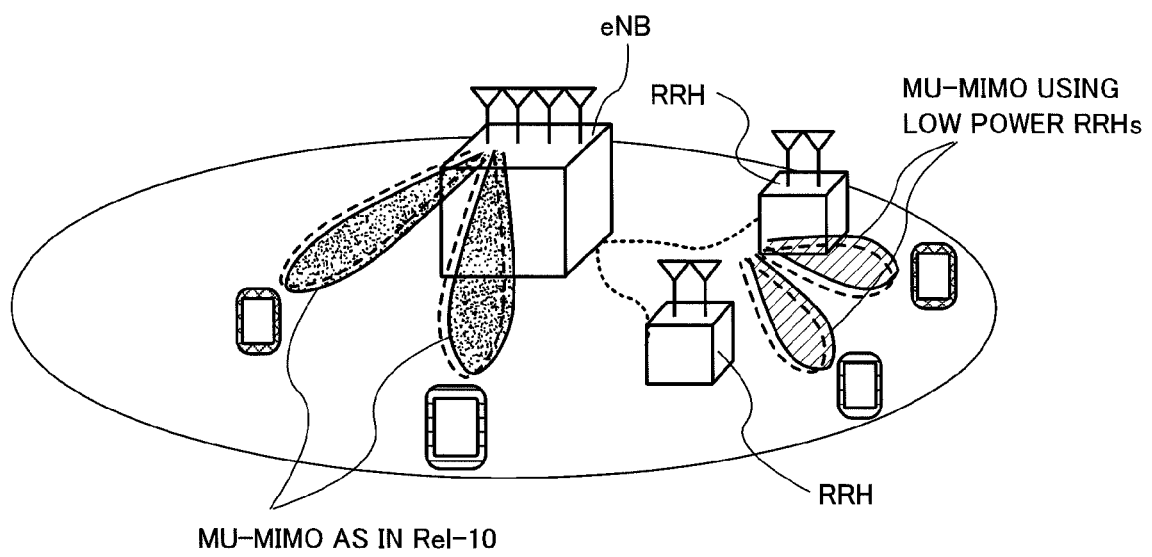
FIG. 1 is a schematic diagram of a HetNet where MU-MIMO is applied.

FIG. 1 is a schematic diagram of a HetNet where MU-MIMO is applied. The system shown in FIG. 1 is configured in layers by providing a micro base station apparatus RRH (Remote Radio Head) having a local cell in the cell of a base station apparatus eNB (eNodeB). In downlink MU-MIMO transmission in such a system, not only transmitting data to a plurality of mobile terminal apparatus UEs (User Equipment) from a plurality of antennas of a base station apparatus eNB at the same time, but also transmitting data for a plurality of mobile terminal apparatus UEs from a plurality of antennas of a micro base station apparatus RRH at the same time is expected, and therefore there is a possibility that downlink control channel capacity runs short.

Also, in a Hetnet where CoMP is applied, there is a possibility to perform cell range expansion dynamically, while a mobile terminal apparatus UE is connected to a macro base station apparatus eNB. In this case, a mobile terminal apparatus UE that is located near the cell edge of the micro base station apparatus RRH receives downlink control signals from the base station apparatus eNB and receives downlink data signals from the micro base station apparatus RRH. Consequently, the downlink control channel capacity in the base station apparatus eNB may run short. To solve this problem, although a configuration to transmit downlink control signals from the micro base station apparatus RRH may be possible, the micro base station apparatus RRH has limited downlink control channel capacity.

Figure 2:
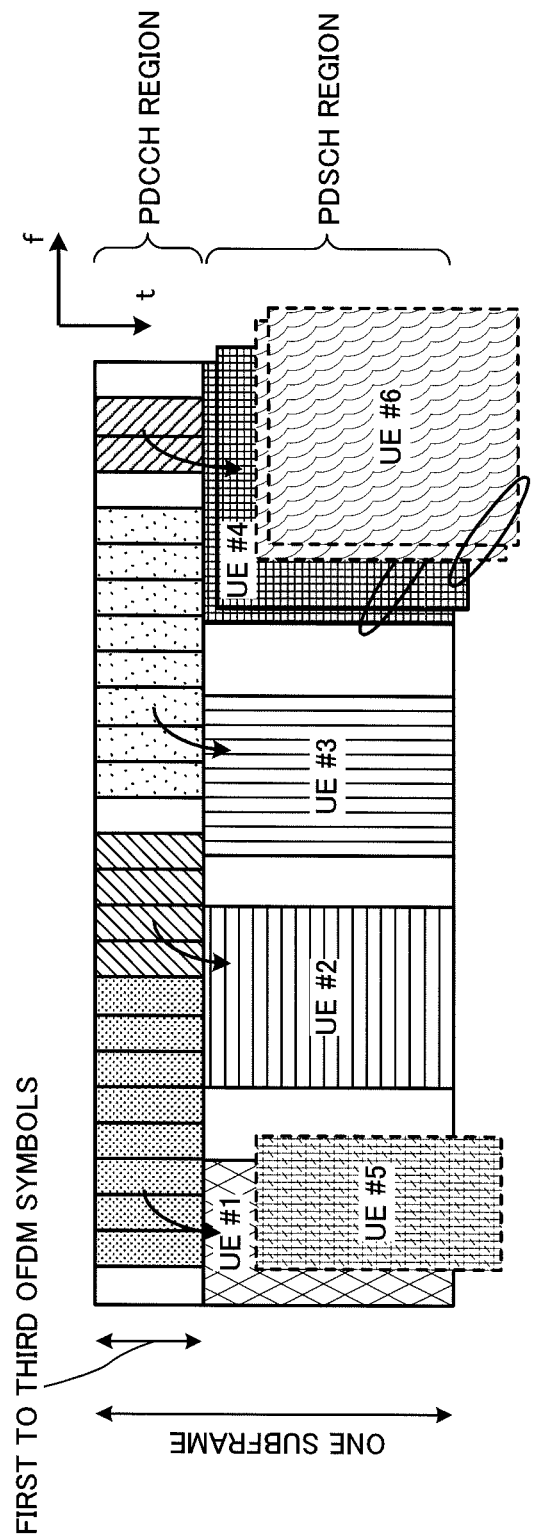
FIG. 2 is a diagram to show an example of a subframe where downlink MU-MIMO transmission is performed.

Like the above-described configuration, although the spectral efficiency is improved by MU-MIMO, the problem that the downlink control channel capacity of the base station apparatus eNB runs short may arise. FIG. 2 is a diagram to show an example of subframe where downlink MU-MIMO transmission is performed. In the subframe, a signal of downlink data for a mobile terminal apparatus UE and a signal of downlink control information for receiving that downlink data are time-division-multiplexed and transmitted.

A predetermined number of OFDM symbols from the top of the subframe are secured as a resource region (PDCCH region) for a downlink control channel (PDCCH: Physical Downlink Control CHannel). The PDCCH region is formed with maximum three OFDM symbols from the top of the subframe, and the number of OFDM symbols changes dynamically per subframe (that is, the number of OFDM symbols is selected from 1 to 3), depending on traffic information (for example, the number of users to be connected). The radio resource region (PDSCH region) for a downlink data channel (PDSCH: Physical Downlink Shared CHannel) is secured in radio resources after a predetermined number of symbols from the top of the subframe.

Furthermore, in the PDCCH region, DCI to correspond to each mobile terminal apparatus UE is allocated. However, cases might occur where, in the PDCCH region that is formed with maximum three OFDM symbols from the subframe top alone, DCI for all of the mobile terminal apparatus UEs cannot be allocated. For example, in the example shown in FIG. 2, the PDCCH region runs short due to increased DCI, and it is not possible to secure resources to allocate downlink control information for mobile terminal apparatus UEs #5 and #6. In this way, in a radio communication system where MU-MIMO transmission is applied, resources to allocate DCI may run short, and the influence against the throughput performance of MU-MIMO transmission poses a problem.

To solve this shortage of the PDCCH region, it may be possible to expand the PDCCH to outside the maximum three OFDM symbols from the top of a subframe (that is, expand the PDCCH to the existing PDSCH region). According to the first aspect of the present invention, a frequency division multiplexing-type PDCCH is set in radio resources that are a predetermined number of symbols after the top symbol of a subframe, downlink control signals are arranged in the FDM-type PDCCH, and the downlink control signals and downlink data signals are time-division-multiplexed and transmitted to a mobile terminal apparatus UE.

Figure 3:
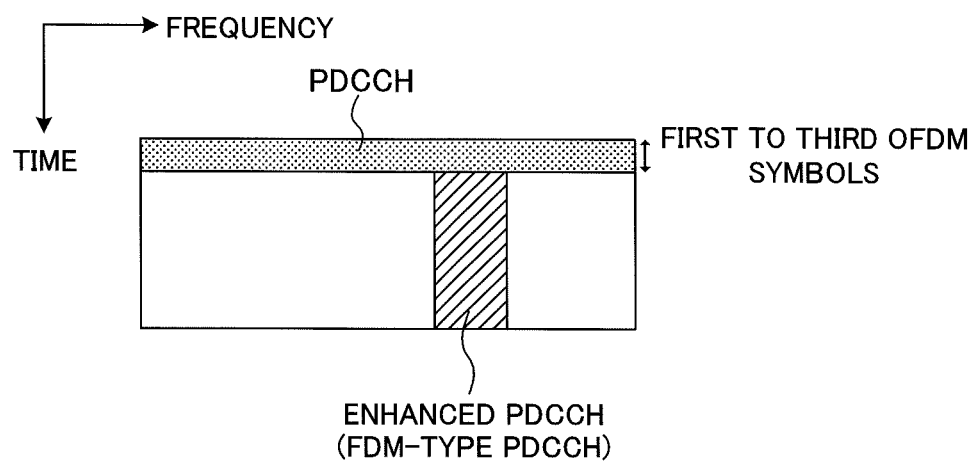
FIG. 3 is a diagram to explain an enhanced PDCCH (FDM-type PDCCH)

FIG. 3 is a diagram to show a subframe configuration, in which an conventional PDCCH and an FDM-type PDCCH are arranged. In several OFDM symbols (the first to third OFDM symbols) from the top of a subframe, a conventional PDCCH is arranged over the entire system band, and, in radio resources after the symbols where the conventional PDCCH is arranged, the FDM-type PDCCH is arranged. The bandwidth of one FDM-type PDCCH in the frequency domain is the size of the radio resource scheduling unit—for example, one resource block (RB).

In this way, by supporting the FDM-type PDCCH as an enhanced PDCCH by the downlink for transmitting downlink control signals from the base station apparatus eNB to the mobile terminal apparatus UE, it is possible to use a predetermined frequency region of a conventional PDSCH region as an enhanced PDCCH region. The enhanced PDCCH region can be demodulated using a user-specific DM-RS (De-Modulation-Reference Signal) that is arranged in the conventional PDSCH region. The DM-RS is defined as a UE-specific reference signal and can be subjected to beam forming separately between UEs, so that sufficient received quality can be achieved. Consequently, even for UEs near the cell edge, it is possible to decrease the aggregation levels as long as the communication environment is good, so that it is possible to improve throughput.

Figure 4:
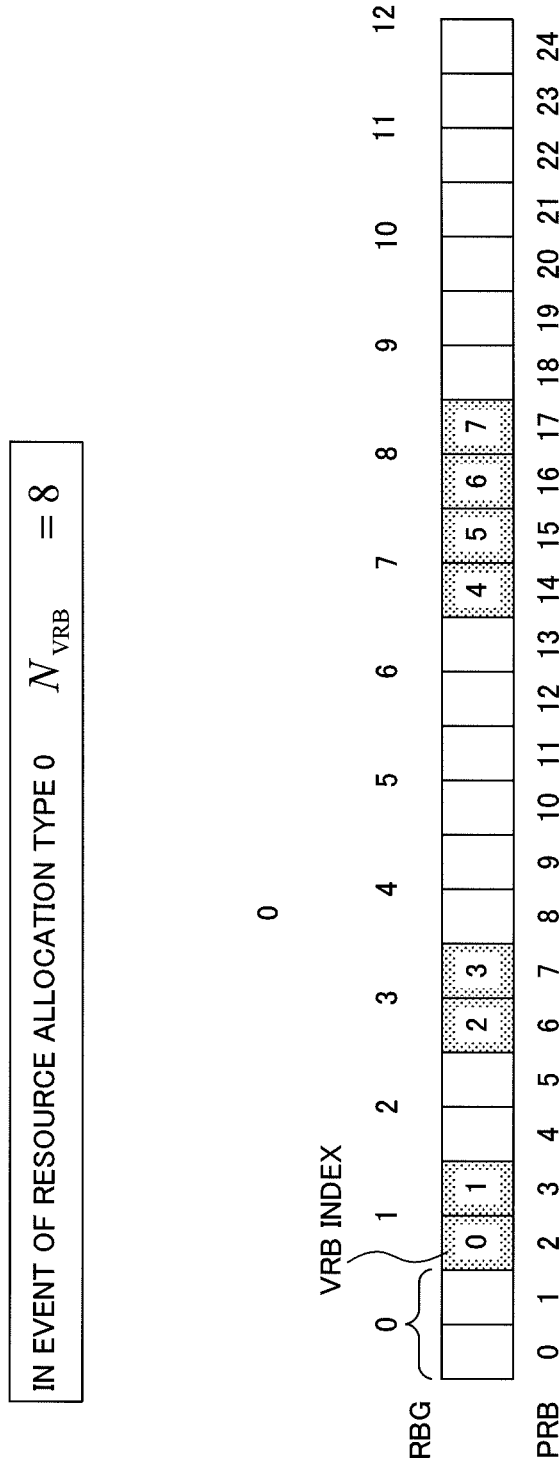
FIG. 4 is a diagram to show an example of allocation of an enhanced PDCCH to a system band.

Here, the method of allocating an enhanced PDCCH (FDM-type PDCCH) to the system band will be described with reference to FIG. 4. Note that FIG. 4 shows a case where eight ($N_{VRB}$=8) virtual resource block (VRB) sets are configured as an enhanced PDCCH, in a cell bandwidth formed with twenty-five physical resource blocks (PRBs). Also, FIG. 4 shows a case where the resource allocation type is 0 (resource allocation type 0). Obviously, the present invention is not limited to this.

As resource block allocation types, there are three different types (resource allocation types 0, 1 and 2). The resource block allocation types 0 and 1 support discontinuous frequency arrangement in the frequency domain, and the type 2 supports only continuous frequency arrangement. The resource block allocation type 0 is represented in units of groups of neighboring resource blocks, not in units of individual resource blocks in the frequency domain, thereby reducing the bitmap size. In FIG. 4, the cell bandwidth is formed with twenty-five resource blocks, so that the size of a resource block group (RBG) is two. In this case, eight VRB sets are arranged in PRBs (RBGs=1, 3, 7 and 8) in units of two.

The base station apparatus eNB reports $N_{VRB}$ VRB sets to the mobile terminal apparatus UE, by higher layer signals, as an enhanced PDCCH. When configuring as shown in FIG. 4, predetermined RBGs (here, RBGs=1, 3, 7 and 8) are reported to the mobile terminal apparatus UE. Also, the VRBs are numbered by VRB indices, in order, from the smallest PRB index (RBG index).

The resource blocks of the enhanced PDCCH may assume a configuration to arrange downlink control signals separately between the first-half slot (first slot) and the second-half slot (second slot). Also, as enhanced PDCCH formats, there are a method of allocating each user's downlink control signal in control channel element (CCE) units, which are formed with a plurality of resource element groups (REGs) ("with cross interleaving"), and a method of allocating each user's downlink control signal in PRB units ("without cross interleaving").

In the event of "with cross interleaving," the mobile terminal apparatus UE performs blind decoding in search spaces defined by CCE indices, and, in the event of "without cross interleaving," the mobile terminal apparatus UE performs blind decoding in search spaces defined by VRB indices. Now, blind decoding in each format will be described below.

<With Cross Interleaving>

In the event of "with cross interleaving," the base station apparatus eNB assigns CCEs, which are formed with continuous REGs in radio resources that are available for use, to an enhanced PDCCH. Note that one CCE is formed with nine REGs. Also, one REG is formed with four resource elements. For example, the base station apparatus eNB determines aggregation levels (aggregation levels $\Lambda$ (=1, 2, 4, 8)), which represents the number of CCEs to allocate continuously, based on the received quality reported from each mobile terminal apparatus UE. Then, in the enhanced PDCCH, the base station apparatus eNB sets REGs to match the number of CCEs corresponding to the aggregation level of each mobile terminal apparatus UE.

Figure 5A:
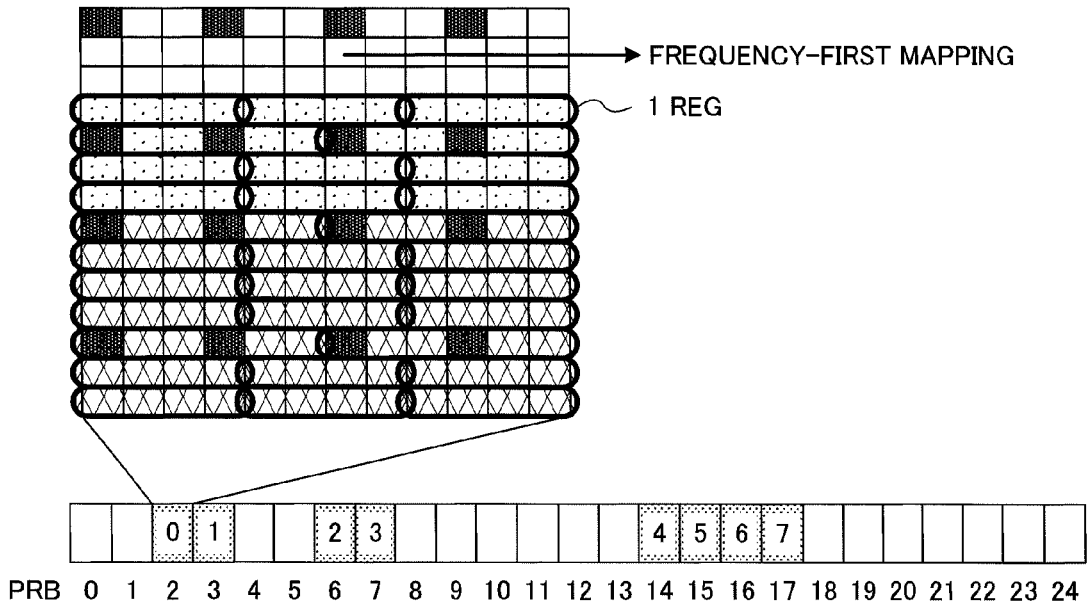
FIG. 5 provides diagrams to explain examples of a search space when the enhanced PDCCH format is "with cross interleaving;"

For example, when eight ($N_{VRB}$=8) VRB sets are arranged as an enhanced PDCCH in the resource allocation type 0 to a cell bandwidth formed with twenty-five PRBs, REGs are arranged in the radio resources of the PRBs as shown in FIG. 5A.

Figure 5B:
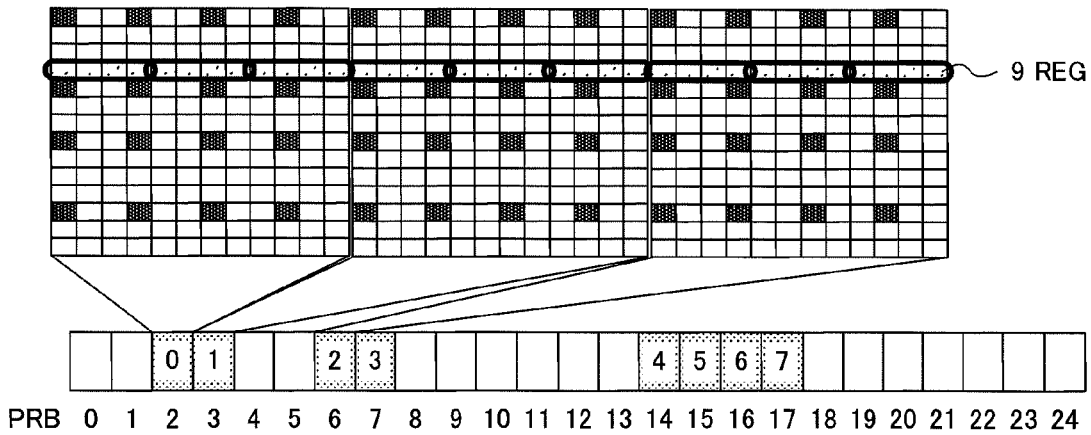

Nine REGs to constitute one CCE are allocated continuously in the frequency domain, to the radio resources of the VRBs constituting the enhanced PDCCH. As shown in FIG. 5B, one CCE is formed with nine REGs that are allocated in the frequency direction of the continuous VRB sets. Note that, in the radio resources of the VRBs, where there are resource elements to be allocated as reference signals such as CRSs, REGs are allocated to avoid these resource elements. Also, based on the aggregation level of each mobile terminal apparatus UE, the base station apparatus eNB allocates continuous CCEs to the enhanced PDCCH signal of each mobile terminal apparatus UE.

The mobile terminal apparatus UE monitors a plurality of enhanced PDCCH candidates that may be set by higher layer signals. This is referred to as blind decoding. The mobile terminal apparatus UE is not reported the CCEs where the enhanced PDCCH signal for the mobile terminal apparatus UE is allocated, and the selected aggregation level. Consequently, enhanced PDCCH decoding is executed for all the CCEs where the enhanced PDCCH signal for the mobile terminal apparatus UE may be allocated.

Also, to minimize the number of times the mobile terminal apparatus UE tries blind decoding, the base station apparatus eNB sets a search space for every mobile terminal apparatus UE, and is able to allocate CCEs for the enhanced PDCCH signal for each mobile terminal apparatus UE in this search space. In this case, the mobile terminal apparatus UE tries to decode the enhanced PDCCH in the corresponding search space.

When trying blind decoding in the search space, the mobile terminal apparatus UE is able to determine the search space by the following equations 1, according to each aggregation level. Note that the numbers of PDCCH candidates to correspond to individual aggregation levels $\Lambda$ (=1, 2, 4 and 8) are 6, 6, 2, and 2.

[equation 1]

$$S_n(\Lambda) = \Lambda \cdot \{(Y_n + m) \bmod \lfloor N_{CCE,j}^{FDM-PDCCH}/\Lambda \rfloor\} + i$$

$$Y_n = (A \times Y_{n-1}) \bmod D \quad \text{(Equations 1)}$$

where $N_{CCE,j}^{FDM-PDCCH}$: the total number of CCEs in slot j of the enhanced PDCCH, i=0, . . . , $\Lambda$−1, m=0, . . . , M($\Lambda$)−1, M($\Lambda$): the number of PDCCH candidates at each aggregation level, $Y_{-1} = n_{UEID} \neq 0$ A=39827, and

D=65537.

<Without Cross Interleaving>

In the event of "without cross interleaving," the base station apparatus eNB allocates DCI for each mobile terminal apparatus UE, to an enhanced PDCCH, in PRB units. For example, the base station apparatus eNB determines the aggregation level, which shows the number of VRBs to allocate continuously, based on the received quality reported from each mobile terminal apparatus UE. Then, to the enhanced PDCCH, a number of VRBs to match the aggregation level of each mobile terminal apparatus UE are allocated as radio resources of the DCI for each mobile terminal apparatus UE.

In the event of "without cross interleaving," radio resources are allocated to the enhanced PDCCH, as radio resources of the DCI for each mobile terminal apparatus UE, in PRB units. In radio resources where the enhanced PDCCH may be arranged, DM-RSs, which are user-specific downlink reference signals, are arranged. Consequently, it is possible to demodulate the enhanced PDCCH using the DM-RSs. In this case, channel estimation is possible in PRB units, so that it is possible to effectively execute beam forming for each mobile terminal apparatus UE.

The mobile terminal apparatus UE monitors a plurality of enhanced PDCCH candidates that may be configured by higher layer signals. The mobile terminal apparatus UE is not reported the VRBs of the enhanced PDCCH where the DCI for the mobile terminal apparatus UE is allocated, and the selected aggregation level. Consequently, enhanced PDCCH decoding is executed for all the VRBs of the enhanced PDCCH signal where the DCI for the mobile terminal apparatus UE may be allocated.

Also, to minimize the number of times the mobile terminal apparatus UE tries blind decoding, the base station apparatus eNB sets a search space for every mobile terminal apparatus UE, and is able to allocate VRBs for the DCI for each mobile terminal apparatus UE in this search space. In this case, the mobile terminal apparatus UE tries to decode the DCI in the corresponding search space (see FIG. 6).

When trying blind decoding in the search space, the mobile terminal apparatus UE is able to determine the search space by the following equation 2, according to each aggregation level (VRB units). Note that the numbers of PDCCH candidates to correspond to individual aggregation levels $\Lambda$ (=1, 2, 4, 8) are 6, 6, 2, and 2. Although a case is shown here where the aggregation level is 6, 6, 2 or 2, obviously, the aggregation level and the number of PDCCH candidates are not limited to these.

[equation 2]

$$n_{VRB}^{FDM-PDCCH} = (\Lambda \cdot m + i) \bmod N_{VRB}^{FDM-PDCCH} \quad \text{(Equation 2)}$$

where
i=0, ..., Λ−1,
m=0, ..., M(Λ)−1,
M(Λ): the number of PDCCH candidates at each aggregation level, and
$N_{VRB}^{FDM\text{-}PDCCH}$: the number of VRBs to set in the enhanced PDCCH.

Figure 6:
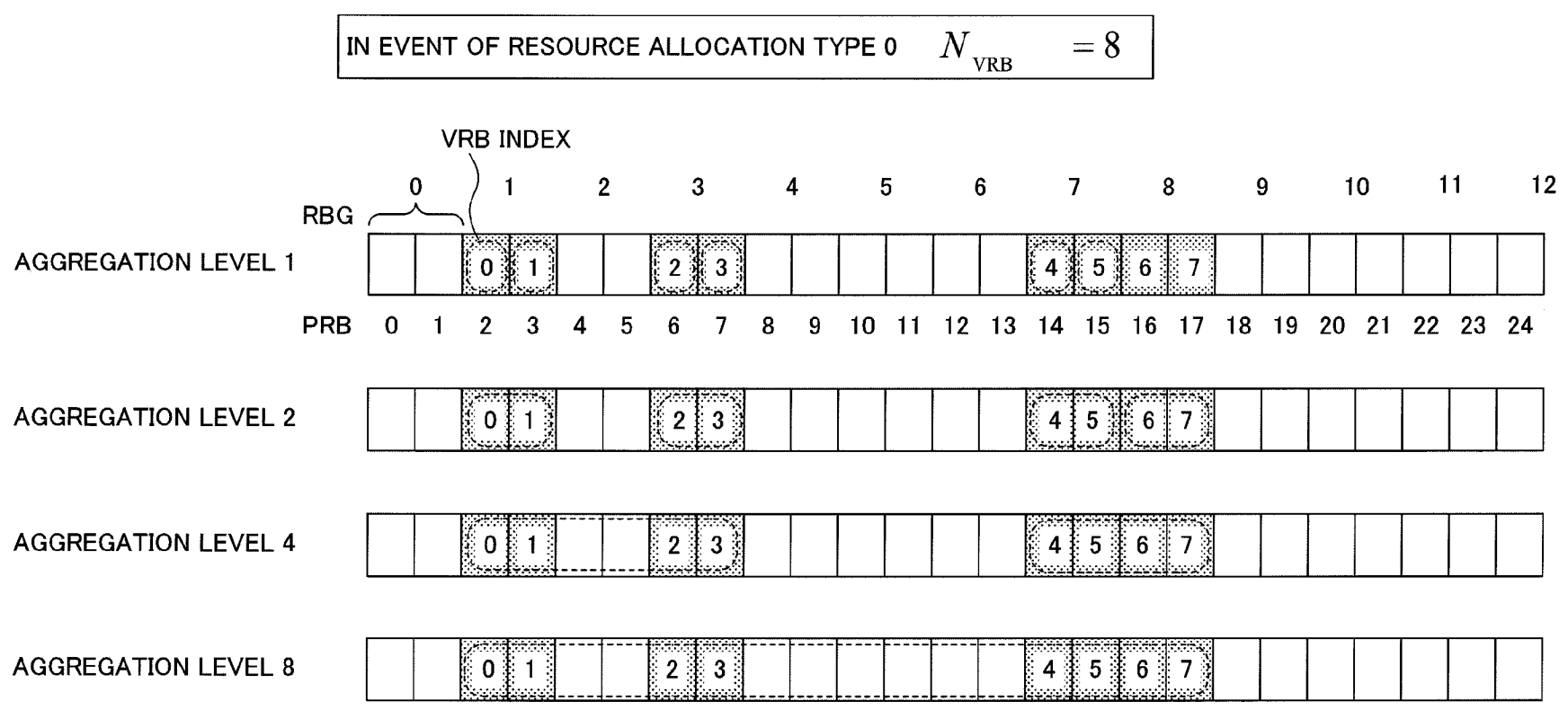

For example, when eight ($N_{VRB}$=8) VRB sets are arranged as an enhanced PDCCH in the resource allocation type 0 in a cell bandwidth formed with twenty-five PRBs, the VRBs are numbered by VRB indices, in order, from the smallest PRB index (RBG index) (see FIG. 6).

At aggregation level 1, six search spaces are set in VRBs #0 to #5. At aggregation level 2, four search spaces are set in VRBs #0 to #7, in two-VRB units. At aggregation level 4, two search spaces are set in VRBs #0 to #7, in four-VRB units. At aggregation level 8, one search space is set in VRBs #0 to #7, in eight-VRB units. Note that, at aggregation levels 2 and 8, search spaces overlap due to shortage of the number of VRBs.

Then, in the mobile terminal apparatus UE, the search spaces are subject to blind decoding according to the aggregation level, and the DCI allocated to the VRBs is acquired. In this way, in the event of "without cross interleaving," each user's DCI is allocated in PRB units, and subject to blind decoding in the search space defined by VRB indices.

In this way, by using an enhanced PDCCH (FDM-type PDCCH) as a control channel region, it is possible to secure downlink control channel capacity. Also, by limiting the search spaces, it is possible to reduce the number of times the mobile terminal apparatus UE tries blind decoding.

According to a second aspect of the present invention, the aggregation levels that can be used for the PDCCH and the FDM-type PDCCH, and the DCI format types, are limited. By this means, it is possible to reduce the number of times of blind decoding or improve characteristics according to the environment.

The number of times the mobile terminal apparatus UE tries blind decoding is based on the numbers of PDCCH candidates (6, 6, 2 and 2) corresponding to individual aggregation levels Λ (=1, 2, 4 and 8). For example, when the numbers of search spaces to correspond to the aggregation levels Λ (=1, 2, 4 and 8) are (6, 6, 2 and 2), respectively, the mobile terminal apparatus UE tries blind decoding sixteen times (=6+6+2+2) to decode the conventional PDCCH, and tries blind decoding sixteen times to decode the FDM-type PDCCH. Consequently, when the PDCCH and the FDM-type PDCCH are used together, compared to the case of using the PDCCH and the FDM-type PDCCH, the number of times the mobile terminal apparatus UE tries blind decoding increases.

Then, the aggregation level is limited such that the aggregation level Λ varies between the PDCCH and the FDM-type PDCCH. For example, the PDCCH aggregation level is limited to four or eight, and the aggregation level of the FDM-type PDCCH is limited to one or two. By this means, as the number of times of blind decoding in the mobile terminal apparatus UE, blind decoding is performed four times for the PDCCH (=2+2), and blind decoding is performed twelve times for the FDM-type PDCCH (=6+6). Consequently, even when the PDCCH and the FDM-type PDCCH are used together, it is possible to keep the number of times the mobile terminal apparatus UE tries blind decoding to sixteen times (=4+12). This is the same number of times as the total number of times the mobile terminal apparatus UE tries blind decoding when the PDCCH and the FDM-type PDCCH are not used together.

Note that the limit of the aggregation level for the PDCCH and the FDM-type PDCCH is not limited to the above case. For example, it is equally possible to determine the limit of the aggregation level such that the number of users to multiplex is maximized, and determine the limit of the aggregation level such that the improvement of performance of cell edge users is given priority.

The mobile terminal apparatus UE is reported the limit of the aggregation level with respect to the PDCCH and the FDM-type PDCCH in advance. When the aggregation levels of the PDCCH and the FDM-type PDCCH are limited, the number of times of blind decoding is limited according to the limited aggregation levels, so that the mobile terminal apparatus UE is able to reduce the total number of times of blind decoding.

Also, the DCI format type is limited such that the DCI format varies between the PDCCH and the FDM-type PDCCH. For example, the PDCCH is limited to transmission of DCI for downlink scheduling allocation (for example, DCI formats 1A, 2 and so on), and the FDM-type PDCCH is limited to transmission of DCI for an uplink grant (for example, DCI formats 0 and 4). Note that the combination of the DCI formats for the PDCCH and the FDM-type PDCCH is not limited to this.

By this means, the mobile terminal apparatus UE demodulates the DCI for downlink scheduling allocation earlier in time, so that it is possible to start demodulating the PDSCH right after the PDCCH that is received earlier in time than the FDM-type PDCCH is decoded.

It is also possible to provide a configuration in which the above-described limit of the aggregation level and the limit of the DCI format are reported from the base station apparatus eNB to the mobile terminal apparatus UE using higher layer signaling and the settings of the above limits are switched dynamically. By this means, flexible system operation is made possible.

According to a third aspect of the present invention, the DCI type of each slot is limited such that a plurality of DCIs of the same bit size are arranged in one of the first-half slot and the second-half slot of a PRB where the FDM-type PDCCH is allocated. By this means, the number of times to try blind decoding in the mobile terminal apparatus UE is reduced, so that it is possible to reduce the load of the mobile terminal apparatus UE.

Figure 7A:
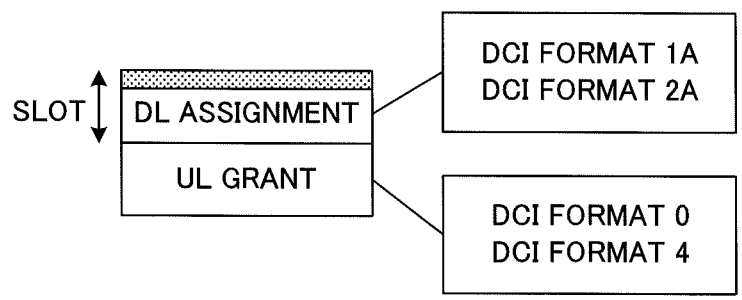
FIG. 7 provides diagrams to show examples of an FDM-type PDCCH resource block.

For example, in the R-PDCCH defined in LTE-A (Rel. 10), downlink scheduling allocation DCI (for example, DCI formats 1A, 2A and so on) is arranged in the first-half slot, and uplink grant DCI (for example, DCI formats 0, 4 and so on) is arranged in the second-half slot. FIG. 7A is a schematic diagram of a DCI arrangement where the allocation of DCI for the R-PDCCH is employed as is in the FDM-type PDCCH resource block proposed by the present inventors.

In this case, the bit size varies between DCI formats 1A and 2A, so that blind decoding becomes necessary individually. Also, the bit size varies between DCI formats 0 and 4, so that separate blind decoding is necessary. Consequently, for example, when the numbers of search spaces corresponding to aggregation levels Λ (=1, 2, 4 and 8) are 6, 6, 2 and 2, respectively, the mobile terminal apparatus UE tries blind decoding sixteen times (=6+6+2+2) for DCI format 1A arranged in the first-half slot. Likewise, blind decoding is tried sixteen times, for each of DCI format 2A arranged in the first-half slot, DCI format 0 arranged in the second-half slot, and DCI format 4 arranged in the second-half slot. Consequently, the total number of times the mobile terminal apparatus UE tries blind decoding is 16×4 times (sixty-four times).

Figure 7B:
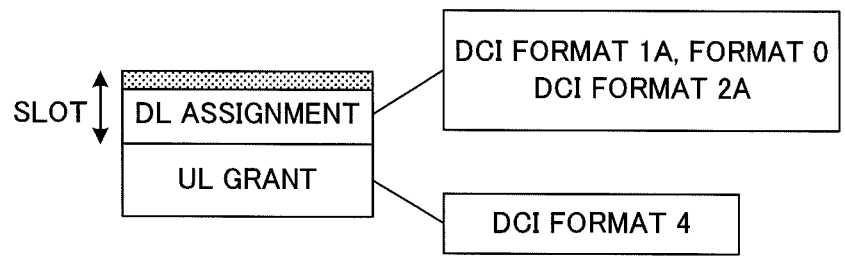

On the other hand, FIG. 7B shows an example of limiting the DCI format such that a plurality of DCIs of the same bit size are arranged in the first-half slot. As shown in FIG. 7B, DCI format 0 for an uplink grant, which is arranged in the second-half slot in FIG. 7A, is re-arranged in the first-half slot. DCI format 0 is the same bit size as DCI format 1A for downlink scheduling allocation arranged in the first-half slot.

In this case, since DCI formats 1A and 0 arranged in the first-half slot are the same bit size, so that the mobile terminal apparatus UE is able to decode these at the same time by one blind decoding (maximum sixteen times). Blind decoding is tried sixteen times for each of DCI format 2A arranged in the first-half slot and DCI format 4 arranged in the second-half slot. Consequently, the number of times the mobile terminal apparatus UE tries blind decoding is 16×3 times (48 times). Consequently, the number of times to try blind decoding in the mobile terminal apparatus UE is reduced, so that it is possible to reduce the load of the mobile terminal apparatus UE. Note that DCI format 1A and DCI format 0 are distinguished by processing the top one bit, after blind decoding is tried sixteen times.

Note that it is possible to provide a configuration in which DCI format 1A arranged in the first-half slot in FIG. 7A is arranged in the second-half slot. In this case, DCI formats 0 and 1A of the same bit size are arranged in the second-half slot. In this case, the number of times the mobile terminal apparatus UE tries blind decoding is 16×3 times (forty-eight times). Note that the combination of DCI formats of the same message size in the FDM-type PDCCH resource blocks is not limited to the above example.

According to a fourth aspect of the present invention, a search space configuration in the event of cross-carrier scheduling is applied to the FDM-type PDCCH is provided.

In LTE-A (Rel-10), fundamental frequency blocks to match the system band up to LTE (Rel. 8) are referred to as component carriers (CCs), and there is an agreement to realize broadbandization by aggregating a plurality of CCs. A communication environment where part of the CCs receives strong interference from other cells and other CCs are less influenced by interference may be provided. So, a mechanism to allocate DCI for a shared data channel (PDSCH and so on) that is transmitted from other CCs that receive strong interference from other cells, from other CCs where the influence of interference is less, is under study. Here, sending the PDCCH of a CC to transmit the PDSCH from another CC besides that CC is referred to as cross-carrier scheduling.

Figure 8:
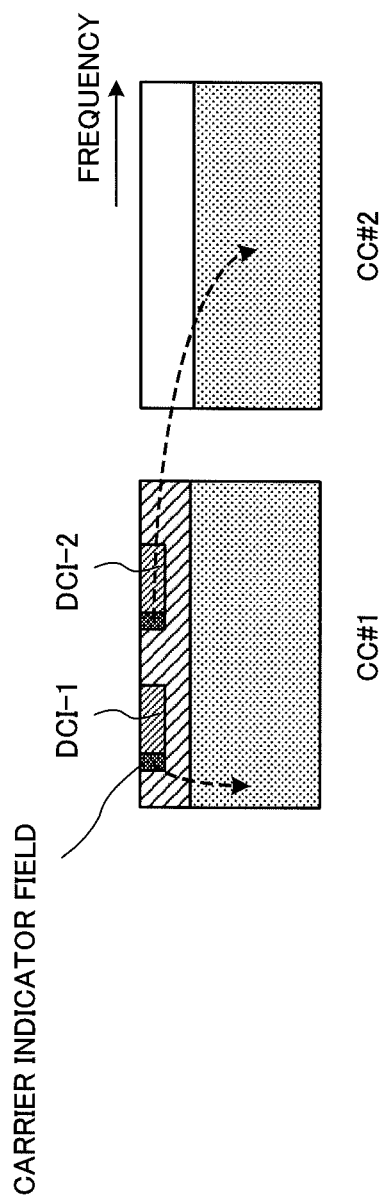
FIG. 8 is a diagram to explain cross-carrier scheduling.

FIG. 8 is a conceptual diagram where cross-carrier scheduling is applied. With the method shown in FIG. 8, cross-carrier scheduling, where the PDCCH for the PDSCH sensed in the CC (secondary cell) is sent from another CC (primary cell) besides that CC (secondary cell), is adopted. To be more specific, DCI-1 for allocating the PDSCH or PUSCH of CC #1 is allocated to the PDCCH of CC #1, and DCI-2 for allocating the PDSCH or PUSCH of CC #2 is allocated to the PDCCH of different CC #1. A three-bit CIF (Carrier Indicator Field) to indicate the CC of the scheduling target, is attached to each DCI. The mobile terminal apparatus UE is able to determine to which CC the PDSCH is allocated, based on the CIF value attached to demodulated DCI.

Figure 9:
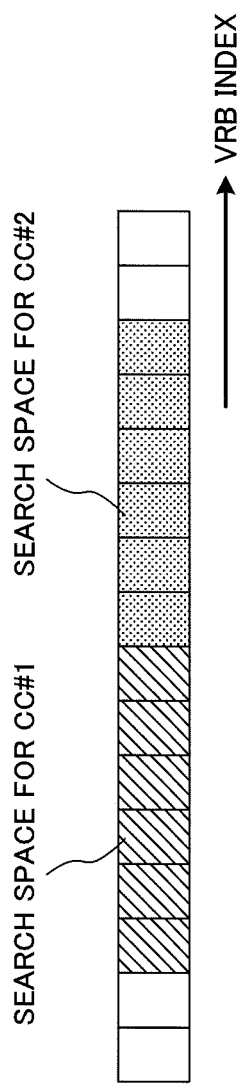
FIG. 9 is a diagram show and explain an example of applying cross-carrier scheduling to an FDM-type PDCCH.

With the present invention, search spaces are configured such that two search spaces of the FDM-type PDCCH for allocating the PDSCH of the primary cell and the FDM-type PDCCH for allocating the PDSCH of the secondary cell, allocated to the same CC (primary cell) by cross-carrier scheduling, continue. FIG. 9 shows a case where the search space of CC #1 to be the primary cell and the search space of CC #2 to be the secondary cell become a continuous configuration.

In this way, by the search space configuration in which the search spaces of the primary cell and the secondary cell continue, it is possible to prevent the search spaces of the primary cell and the secondary cell from overlapping. By this means, it is possible to reduce the possibility that the DCI to allocate the PDSCH between different CCs from being blocked.

When the method of allocating DCI to the FDM-type PDCCH is "with cross interleaving," it is possible to find the starting position of the search space in subframe n by the following equations 3. Note that the numbers of FDM-type PDCCH candidates corresponding to aggregation levels Λ (=1, 2, 4 and 8) are 6, 6, 2 and 2, respectively.

[equation 3]

$$S_n(\Lambda) = \Lambda \cdot \{(Y_n + m + n_{CI} M(\Lambda)) \bmod \lfloor N_{CCE,j}^{FDM-PDCCH} / \Lambda \rfloor\} + i$$

$$Y_n = (A \times Y_{n-1}) \bmod D \quad \text{(Equations 3)}$$

where
$N_{CCE,j}^{FDM-PDCCH}$: the total number of CCEs in slot j in the enhanced PDCCH,
i=0, ..., Λ−1,
m=0, ..., M(Λ)−1,
$n_{CI}$=CIF value
M(Λ): the number of PDCCH candidates at each aggregation level,
$Y_{-1} = n_{UEID} \neq 0$,
A=39827, and
D=65537.

Also, when the method of allocating DCI to the FDM-type PDCCH is "without cross interleaving," DCI is allocated in PRB units, so that it is possible to determine the starting position of the search space in subframe n by the following equation 4.

[equation 4]

$$S_n(\Lambda) = \Lambda \cdot \{(Y_n + m + n_{CI} M(\Lambda)) \bmod N_{VRB}^{FDM-PDCCH}\} + i \quad \text{(Equation 4)}$$

Now, a radio communication system 1 having a mobile terminal apparatus 10 and a base station apparatus 20 according to an embodiment of the present invention will be described with reference to FIG. 10. The mobile terminal apparatus 10 and the base station apparatus 20 support LTE-A.

Figure 10:
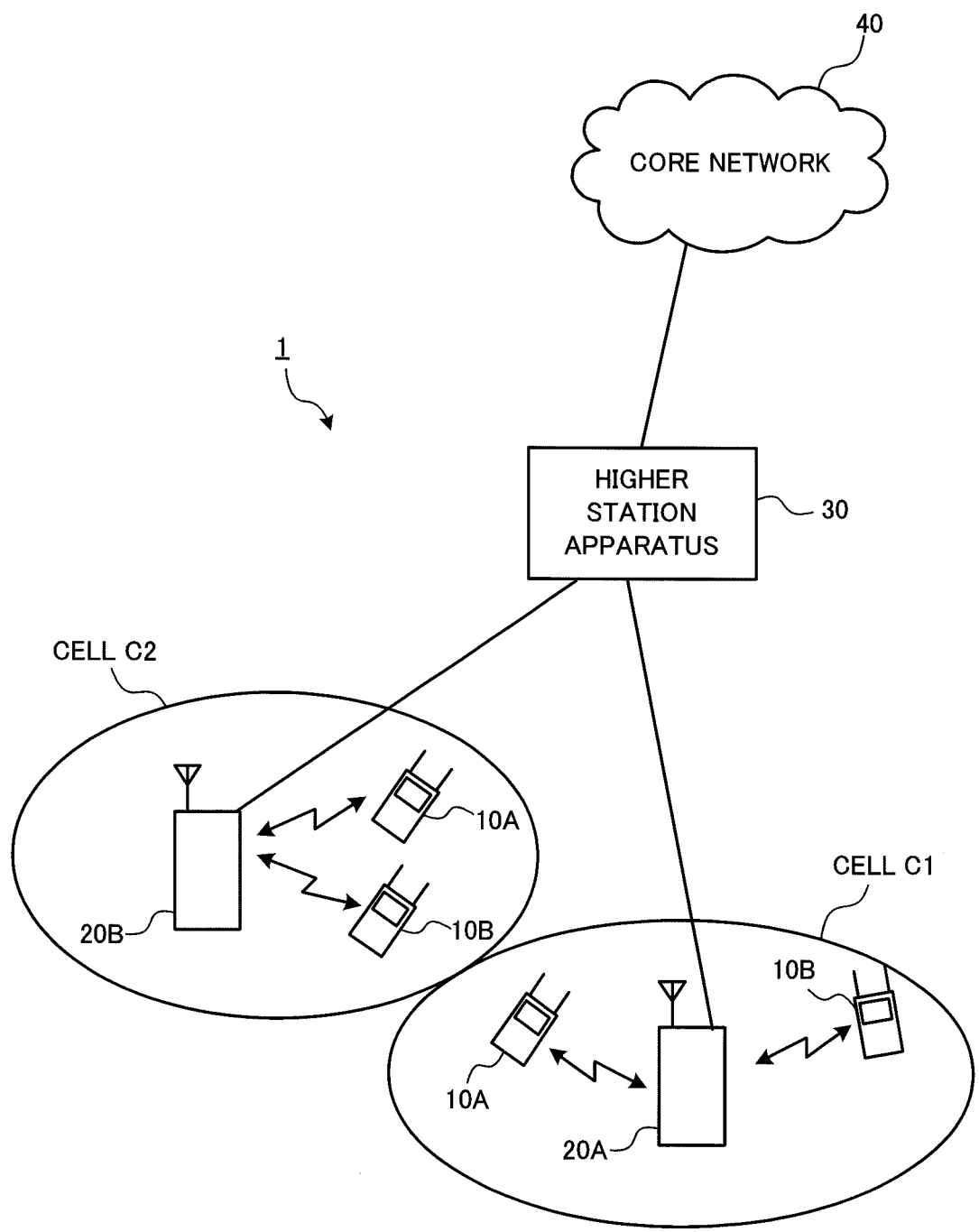
FIG. 10 is a diagram to explain a system configuration of a radio communication system.

As shown in FIG. 10, the radio communication system 1 is configured to include a base station apparatus 20, a plurality of mobile terminal apparatuses 10 that communicate with this base station apparatus 20. The base station apparatus 20 is connected with a higher station apparatus 30, and this higher station apparatus 30 is connected with a core network 40. Also, base station apparatuses 20 are connected with each other by wire connection or by wireless connection. The mobile terminal apparatuses 10 are able to communicate with the base station apparatuses 20 in cells C1 and C2. Note that the higher station apparatus 30 includes, for example, an access gateway apparatus, a radio network controller (RNC), a mobility management entity (MME) and so on, but is by no means limited to these.

Although each mobile terminal apparatus 10 may be either an LTE terminal or an LTE-A terminal, in the following description, simply a mobile terminal apparatus will be described, unless specified otherwise. Also, although the mobile terminal apparatus 10 performs radio communication with the base station apparatus 20 for ease of explanation, more generally, user apparatuses including mobile terminal apparatuses and fixed terminal apparatuses may be used as well.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. Note that the uplink radio access scheme is not limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channel configurations defined in LTE-A will be described. Downlink communication channels include a PDSCH that is used by each mobile terminal apparatus 10 on a shared basis, downlink L1/L2 control channels (PDCCH, PCFICH, PHICH), and an enhanced PDCCH. User data and higher control signals are transmitted by the PDSCH. Here, downlink control signals are multiplexed on radio resources up to a predetermined number of OFDM symbols (the first to third OFDM symbols) from the subframe top, and the enhanced PDCCH signal and the PDSCH signal are frequency-division-multiplexed on radio resources after a predetermined number of OFDM symbols.

PDSCH and PUSCH scheduling information is transmitted by means of the enhanced PDCCH (FDM-type PDCCH). The enhanced PDCCH is used to support the shortage of PDCCH capacity using the resource region where the PDSCH is allocated. The higher control signals may include information related to the PRB positions where the enhanced PDCCH is set (for example, RBG information), the limits of the aggregation levels for the PDCCH and the enhanced PDCCH, the limits of DCI format types, and information related to the parameters to use for the control algorithm to determine the starting position of the search space.

The uplink control channels include a PUSCH that is used by each mobile terminal apparatus 10 on a shared basis, and a PUCCH, which is an uplink control channel. User data is transmitted by means of this PUSCH. Downlink radio quality information (CQI: Channel Quality Indicator), retransmission acknowledgement signals (ACK/NACK signal) and so on are transmitted by the PUCCH.

Figure 11:
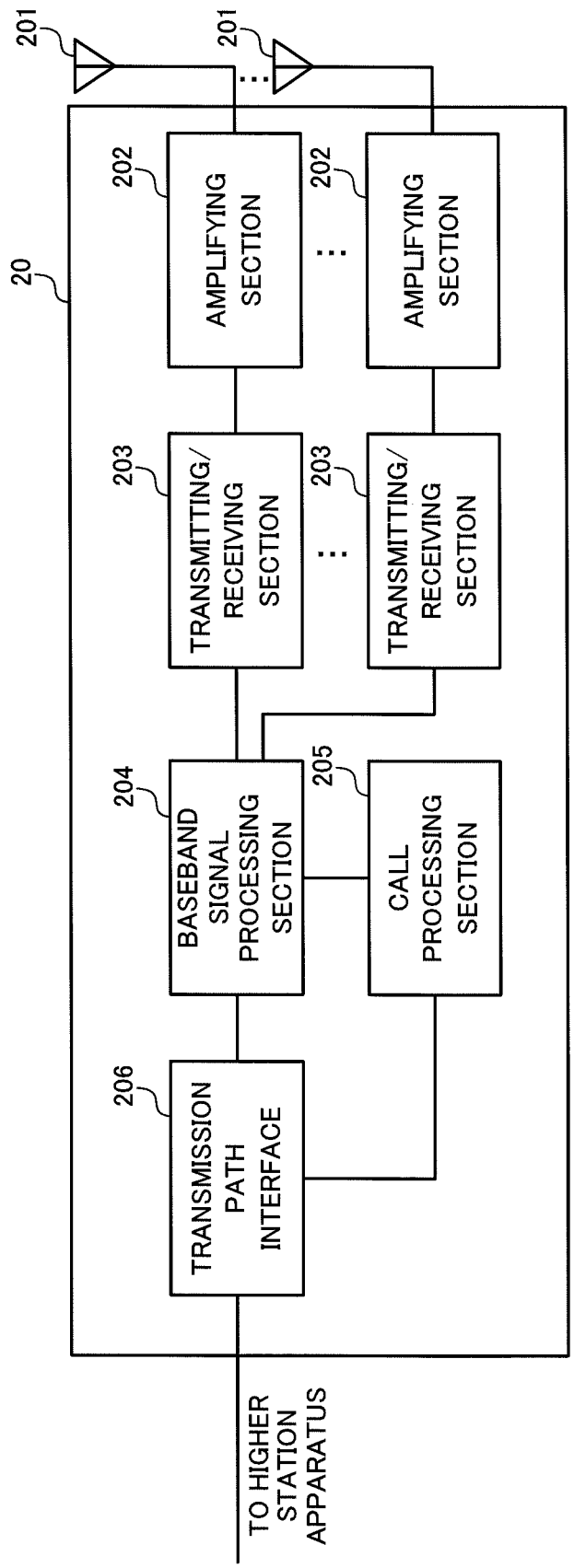
FIG. 11 is a diagram to explain an overall configuration of a base station apparatus according to the present embodiment.

Referring to FIG. 11, an overall configuration of the base station apparatus 20 according to the present embodiment will be described. The base station apparatus 20 has a plurality of transmitting/receiving antennas 201 for MIMO transmission, an amplifying section 202, a transmitting/receiving section (reporting section) 203, a baseband signal processing section 204, a call processing section 205, and a transmission path interface 206.

User data to be transmitted from the base station apparatus 20 to the mobile terminal apparatus 10 is input from the higher station apparatus 30, into the baseband signal processing section 204, via the transmission path interface 206. The baseband signal processing section 204 performs a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process.

The baseband signal processing section 204 reports, to the mobile terminal apparatus 10, control information to allow communication in the cell, by a broadcast channel. The broadcast information for communication in the cell includes, for example, the uplink or downlink system bandwidth, identification information of a root sequence (root sequence index) for generating random access preamble signals in the PRACH (Physical Random Access Channel), and so on.

Each transmitting/receiving section 203 converts the baseband signal, which has been subjected to precoding and is output from the baseband signal processing section 204 per antenna, into a radio frequency band. The amplifying section 202 amplifies the radio frequency signal having been subjected to frequency conversion and transmits the result from the transmitting/receiving antennas 201. Meanwhile, as for data to be transmitted on the uplink from the mobile terminal apparatus 10 to the base station apparatus 20, a radio frequency signal that is received in each transmitting/receiving antenna 201 is amplified in the amplifying section 202, subjected to frequency conversion and converted into a baseband signal in each transmitting/receiving section 203, and is input in the baseband signal processing section 204.

The baseband signal processing section 204 performs an FFT process, an IDFT process, error correction decoding, a MAC retransmission control receiving process, and RLC layer and PDCP layer receiving processes, of the user data that is included in the input baseband signal, and the result is transferred to the higher station apparatus 30 via the transmission path interface 206. The call processing section 205 performs call processing such as setting up and releasing calls, manages the state of the base station apparatus 20 and manages the radio resources.

Figure 12:
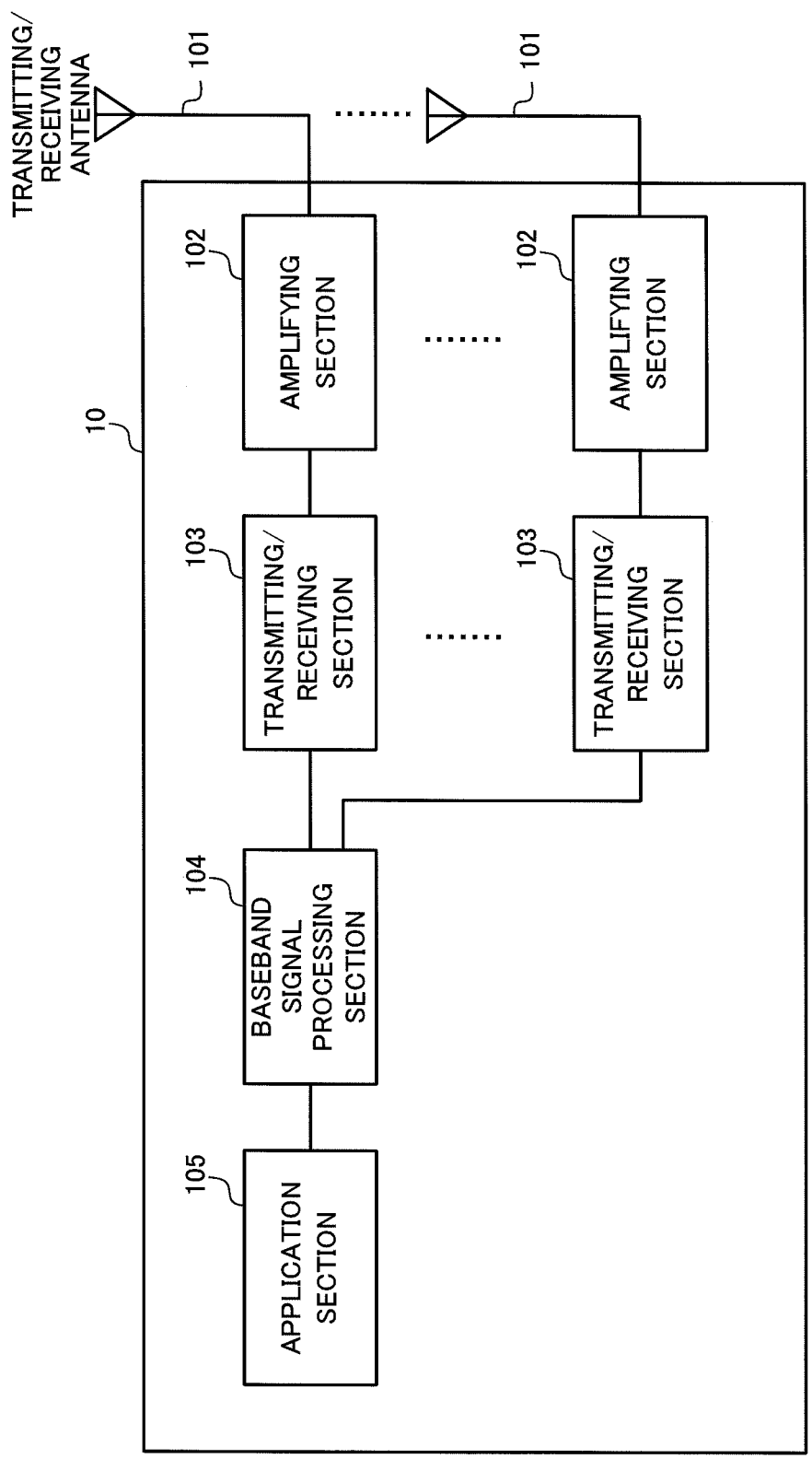
FIG. 12 is a block diagram to show an overall configuration of a mobile terminal apparatus according to the present embodiment.

Next, referring to FIG. 12, an overall configuration of a mobile terminal apparatus according to the present embodiment will be described. An LTE terminal and an LTE-A terminal have the same hardware configurations in principle parts, and therefore will be described indiscriminately. A mobile terminal apparatus 10 has a plurality of transmitting/receiving antennas 101 for MIMO transmission, an amplifying section 102, a transmitting/receiving section 103, a baseband signal processing section 104, and an application section 105.

As for downlink data, radio frequency signals that are received in a plurality of transmitting/receiving antennas 10 are each amplified in the amplifying section 10, and subjected to frequency conversion and converted into a baseband signal in the transmitting/receiving section 10. This baseband signal is subjected to receiving processes such as an FFT process, error correction decoding and retransmission control, in the baseband signal processing section 104. In this downlink data, downlink user data is transferred to the application section 10. The application section 105 performs processes related to higher layers higher than the physical layer and the MAC layer. Also, in the downlink data, broadcast information is also transferred to the application section 105.

On the other hand, uplink user data is input from the application section 105 into the baseband signal processing section 104. The baseband signal processing section 104 performs transmission process for retransmission control (HARQ (Hybrid ARQ)), channel coding, precoding, a DFT process, an IFFT process, and so on, and the result is transferred to each transmitting/receiving section 103.

The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antennas 101.

Figure 13:
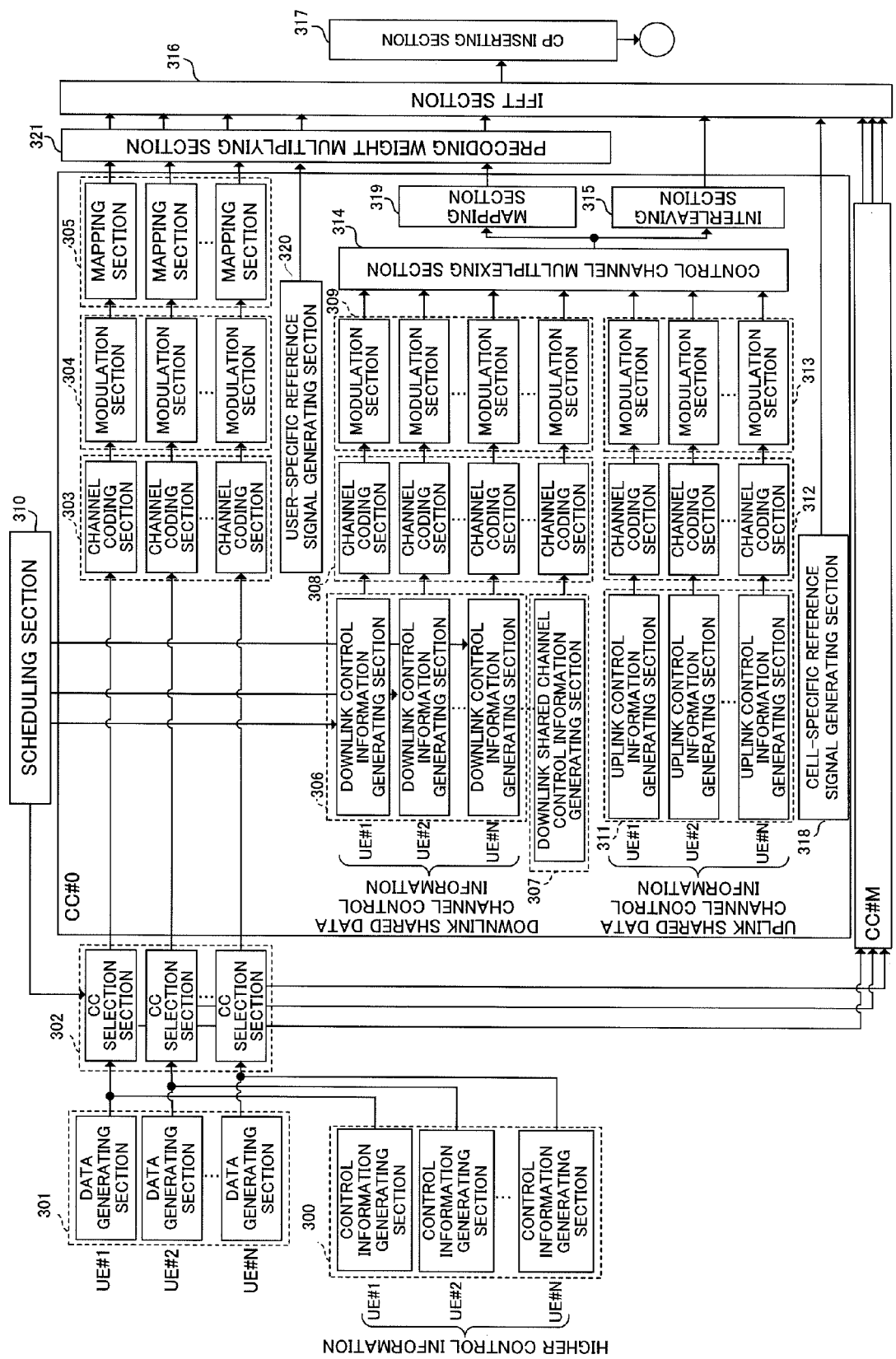
FIG. 13 is a functional block diagram of a baseband signal processing section provided in a base station apparatus according to the present embodiment, and part of higher layers.

FIG. 13 is a functional block diagram of a baseband signal processing section 204 provided in the base station apparatus 20 according to the present embodiment and part of higher layers, and primarily illustrates the function blocks for transmission processes in the baseband signal processing section 204. FIG. 13 shows an example of a base station configuration which can support the maximum number of component carriers M (CC #0 to CC #M). Transmission data for the mobile terminal apparatus 10 under the base station apparatus 20 is transferred from the higher station apparatus 30 to the base station apparatus 20.

Control information generating sections 300 generate higher control information for performing higher layer signaling (for example, RRC signaling), on a per user basis. Also, the higher control information may include resource allocation signal (PRB positions) where an enhanced PDCCH (FDM-type PDCCH) can be mapped in advance. Also, information related to parameters used for the control algorithm to determine the starting position of a search space, and information related to the limit of aggregation levels or the limit of DCI format types.

The data generating section 301 outputs transmission data transferred from the higher station apparatus 30 as user data separately. The component carrier selection section 302 selects, on a per user basis, component carriers to use for radio communication with the mobile terminal apparatus 10. An increase/decrease of component carriers is reported from the base station apparatus 20 to the mobile terminal apparatus 10 by RRC signaling, and a message of completion is received from the mobile terminal apparatus 10.

The scheduling section 310 controls the assignment of component carriers to a mobile terminal apparatus 10 in communication with them according to overall communication quality of the system band. Also, from the component carriers that are selected on a per mobile terminal apparatus basis, a specific component carrier (PCC) is determined. Also, the scheduling section 310 controls the allocation of resources in component carriers CC #1 to CC #M. LTE users and LTE-A users are scheduled separately. The scheduling section 310 receives the transmission data and retransmission command from the higher station apparatus 30, and also receives the channel estimation values and CQI of resource block from the receiving section having measured an uplink received signal.

Also, the scheduling section 310 schedules uplink and downlink control information and uplink and downlink shared channel signals with reference to the retransmission commands, channel estimation values and CQIs that are inputted. A propagation path in mobile communication varies differently per frequency, due to frequency selective fading. So, the scheduling section 310 designates resource blocks (mapping positions) of good communication quality, on a per subframe basis, with respect to the user data for each mobile terminal apparatus 10 (which is referred to as "adaptive frequency scheduling"). In adaptive frequency scheduling, a mobile terminal apparatus 10 having good propagation path quality is selected for each resource block. Consequently, the scheduling section 310 designates resource blocks (mapping positions), using the CQI of each resource block, fed back from each mobile terminal apparatus 10.

Likewise, the scheduling section 310 designates resource blocks (mapping positions) of good communication quality, on a per subframe basis, with respect to control information transmitted by the enhanced PDCCH, by adaptive frequency scheduling. Consequently, the scheduling section 310 designates resource blocks (mapping positions) using the CQI of each resource block, fed back from each mobile terminal apparatus 10.

Also, the scheduling section 310 controls the aggregation level according to the conditions of the propagation path with the mobile terminal apparatus 10. As for the PDCCH, the CCE aggregation level is controlled, and, as for the enhanced PDCCH, the CCE aggregation level (in the event of "with cross interleaving") or the VRB aggregation level (in the event of "without cross interleaving") is controlled. Note that, when the aggregation levels are limited in the PDCCH and the enhanced PDCCH, the aggregation levels are controlled within a range for the aggregation levels. For example, the aggregation levels for the PDCCH are limited to four and eight, and the aggregation levels for the enhanced PDCCH are limited to one and two. For cell edge users, the CCE aggregation level and the VRB aggregation level are increased. Also, the MCS (coding rate and modulation scheme) that fulfills a predetermined block error rate with the allocated resource blocks is determined. Parameters to fulfill the MCS (coding rate and modulation scheme) determined by the scheduling section 310 are set in the channel coding sections 303, 308 and 312, and in the modulation sections 304, 309 and 313.

The baseband signal processing section 204 has channel coding sections 303, modulation sections 304, and mapping sections 305, to match the maximum number of users to be multiplexed, N, in one component carrier. The channel coding sections 303 perform channel coding of the downlink shared data channel (PDSCH), which is formed with user data (including part of higher control signals) that is output from the data generating sections 301, on a per user basis. The modulation sections 304 modulate user data having been subjected to channel coding, on a per user basis. The mapping sections 305 map the modulated user data to radio resources.

Also, the baseband signal processing section 204 has generating sections that generate control information using a predetermined DCI format from a plurality of DCI formats (downlink control information generating sections 306 and uplink control information generating sections 311). The plurality of DCI formats include a DCI format having an uplink grant as its content (for example, DCI format 0/4), and a DCI format having downlink scheduling allocation as its content (for example, DCI format 1A and so on). The scheduling section 310 is able to limit the DCI formats to apply to the PDCCH and the enhanced PDCCH for the downlink control information generating sections 306 and uplink control information generating sections 311. For example, the scheduling section 310 apply only downlink DCI formats (1A, 2 and so on) to the PDCCH on a limited basis, and apply only uplink DCI formats (0, 4 and so on) to the enhanced PDCCH on a limited basis. Also, regarding the enhanced PDCCH, the scheduling section 310 executes control such that a plurality of DCI formats of the same bit size are arranged in the first-half slot or the second-half slot in the time domain.

The downlink control information generating section 306 generates downlink shared data channel control information for controlling the PDSCH, using DCI formats having downlink scheduling allocation as its content (for example, DCI format 1A and so on). At this time, the downlink shared data channel control information is generated per user. Also, the downlink shared data channel control information contains an identification field (CIF) which identifies the uplink serving cell where the PDSCH is allocated. The scheduling section 310 determines the search space starting position based on the CIF value, when cross-carrier scheduling is applied. In the event of "with cross interleaving," the scheduling section 310 sets the search space based on the search space starting position calculated by the equations (3), and, in the event of "without cross interleaving," the scheduling section 310 sets the search space based on the search space starting position calculated by the equation (4). Also, the baseband signal processing section 204 has a downlink shared channel control information generating section 307 which generates downlink shared control channel control information, which is downlink control information that is common between users.

The uplink control information generating section 311 generates uplink data channel control information for controlling the PUSCH using DCI formats having an uplink grant as its content (for example, DCI format 0/4). The uplink shared data channel control information is generated on a per user basis. Also, the uplink shared data channel control information contains an identification field (CIF), which identifies the uplink serving cell where the PUSCH is allocated. Also, the baseband signal processing section 204 has a channel coding section 312 that performs channel coding of generated uplink shared data channel control information on a per user basis, and a modulation section 313 which modulates the uplink shared data channel control information having been subjected to channel coding on a per user basis.

The cell-specific reference signal generating section 318 generates a cell-specific reference signal (CRS). The cell-specific reference signal (CRS) is multiplexed on radio resources of the above PDCCH region and transmitted. Also, the user-specific reference signal generating section 320 generates a downlink demodulation reference signal (DM-RS). The user-specific downlink demodulation reference signal (DM-RS) is multiplexed on the radio resources of the above PDSCH region and transmitted.

Control information that is modulated on a per user basis in the above modulation sections 309 and 313 is multiplexed by a control channel multiplexing section 314. Downlink control information for the PDCCH is multiplexed on the first to third OFDM symbols from a top symbol of the subframe, and is interleaved in an interleaving section 315. Meanwhile, downlink control information for the enhanced PDCCH (FRM-type PDCCH) is frequency-division-multiplexed on radio resources after a predetermined number of symbols in the subframe, and is mapped to resource blocks (PRBs) in a mapping section 319. In this case, the mapping section 319 performs the mapping based on commands from the scheduling section 310. Note that the mapping section 319 may perform mapping by adopting "with cross interleaving," in addition to "without cross interleaving."

The precoding weight multiplying section 321 controls (shifts) the phase and/or amplitude of the transmission data and user-specific demodulation reference signals (DM-RSs) that are mapped to the subcarriers, for each of a plurality of antennas. The transmission data and user-specific demodulation reference signals (DM-RSs) having been subjected to a phase and/or amplitude shift in the precoding weight multiplying section 321 are output to an IFFT section 316.

The IFFT section 316 receives as input control signals from the interleaving section 315 and the mapping section 318, and receives as input user data from the mapping section 305. The IFFT section 316 converts the downlink channel signal from a frequency domain signal into a time sequence signal by an inverse fast Fourier transform. A cyclic prefix inserting section 317 inserts cyclic prefixes in the time sequence signal of the downlink channel signal. Note that a cyclic prefix functions as a guard interval for cancelling the differences in multipath propagation delay. The transmission data to which cyclic prefixes have been added, is transmitted to the transmitting/receiving section 203.

Figure 14:
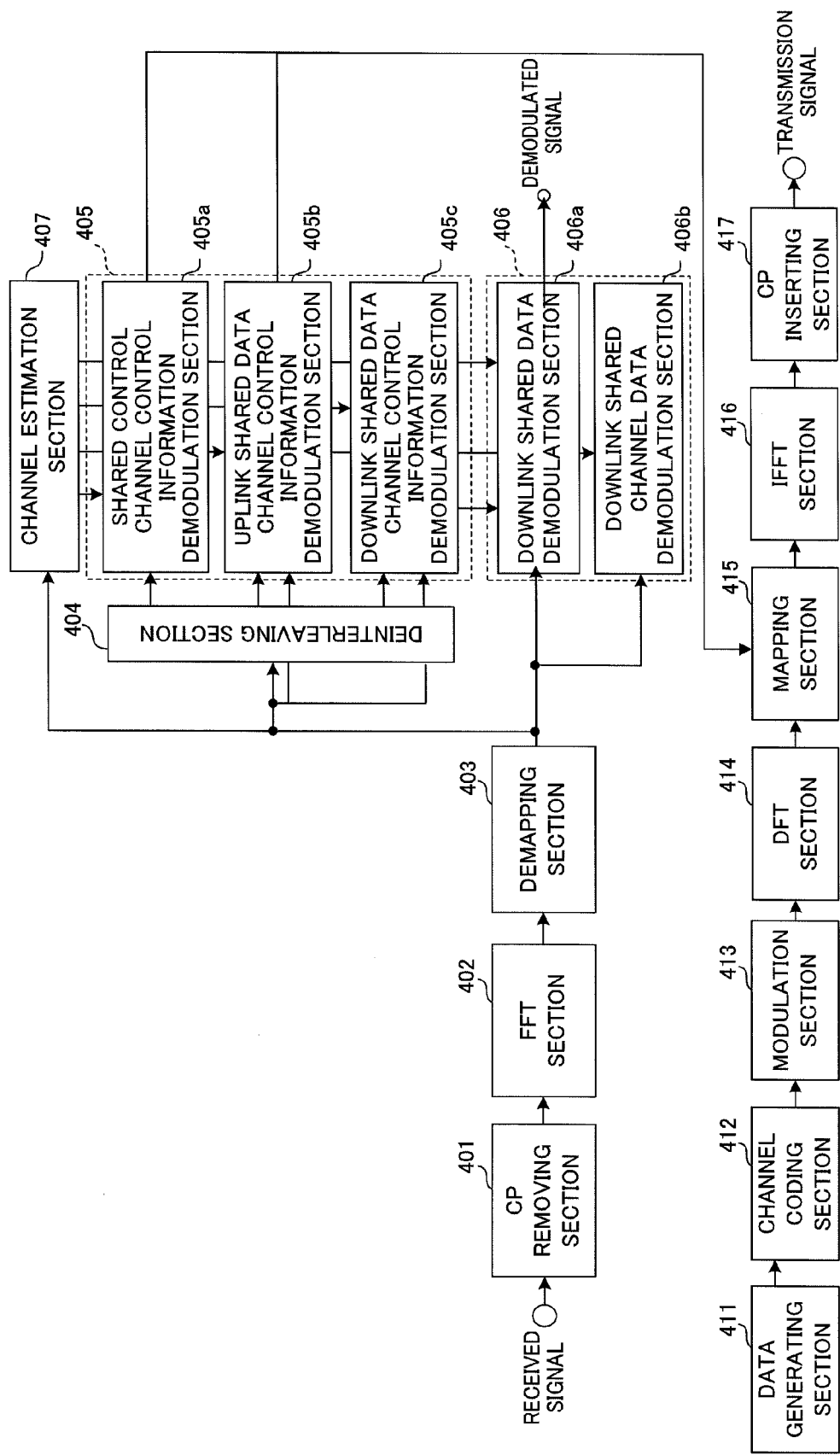
FIG. 14 is a functional block diagram of a baseband signal processing section provided in a mobile terminal apparatus.

FIG. 14 is a functional block diagram of the baseband signal processing section 104 provided in a user terminal 10 and is a function block of an LTE-A terminal which supports LTE-A.

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal in a demapping section 403. The demapping sections 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from the application section 105. The multiplex control information output from the demapping section 403 is deinterleaved in a deinterleaving section 404. Note that it is also possible to provide a configuration in which the enhanced PDCCH signal that is not interleaved is input as is in a control information demodulation section 405, without involving the de-interleaving section 404.

Also, the baseband signal processing section 104 has a control information demodulation section 405 that demodulates control information, a data demodulation section 406 that demodulates downlink shared data, and a channel estimation section 407. The control information demodulation section 405 has a shared control channel control information demodulation section 405a that demodulates downlink shared control channel control information from multiplex control information, an uplink shared data channel control information demodulation section 405b that demodulates uplink shared data channel control information from multiplex control information, and a downlink shared data channel control information demodulation section 405c that demodulates downlink shared data channel control information from multiplex control information. The data demodulation section 406 has a downlink shared data demodulation section 406a that demodulates user data and higher control signals, and a downlink shared channel data demodulation section 406b that demodulates downlink shared channel data.

The shared control channel control information demodulation section 405a extracts shared control channel control information, which is control information that is common between users, by the blind decoding process, demodulation process, channel decoding process and so on of the common search space of the downlink control channel (PDCCH). The shared control channel control information includes downlink channel quality information (CQI), and therefore is input in a mapping section 415 and mapped as part of transmission data for the base station apparatus 20.

The uplink shared data channel control information demodulation section 405b extracts uplink shared data channel control information (for example, UL grant) by the blind decoding process, demodulation process, channel decoding process and so on of the user-specific search space of the downlink control channel (PDCCH). The demodulated uplink shared data channel control information is input in the mapping section 415 and is used to control the uplink shared data channel (PUSCH).

The downlink shared data channel control information demodulation section 405c extracts user-specific downlink shared data channel control information (for example, DL assignment) by the blind decoding process, demodulation process, channel decoding process and so on of the user-specific search space of the downlink control channel (PD-CCH). The demodulated downlink shared data channel control information is input in the downlink shared data demodulation section 406a, is used to control the downlink shared data channel (PDSCH), and is input in the downlink shared data demodulating section 406a.

The control information demodulation section 405 demodulates the PCFICH from the top symbol of a subframe and specifies the control region where the PDCCH is arranged, and demodulates the PDCCH from the specified control region. Also, the control information demodulation section 405 demodulates the enhanced PDCCH that is frequency-division-multiplexed in radio resources (data region) from the next symbol of the control region to the last symbol of the subframe.

When cross-carrier scheduling is applied, the control information demodulation section 405 calculates the search space starting position by the equations 3 in the event of "with cross interleaving," and performs blind decoding of the search space specified based on the calculated search space starting position. Also, in the event of "without cross interleaving," the control information demodulation section 405 calculates the search space starting position by the equation 4 and performs blind decoding of the search space specified based on the calculated search space starting position.

Note that blind decoding is performed in CCE units with respect to the enhanced PDCCH and PDCCH where "with cross interleaving" applies, and blind decoding is performed in VRB units with respect to the enhanced PDCCH and PDCCH where "without cross interleaving" applies.

When information about the limits of the aggregation levels for the enhanced PDCCH and the PDCCH is reported, the control information demodulation section 405 executes blind decoding according to each aggregation level limited for the enhanced PDCCH and the PDCCH. Also, when downlink DCI (formats 1A, 2 and so on) is allocated to the PDCCH and uplink DCI (formats 0, 4 and so on) is allocated to the enhanced PDCCH, the downlink DCI is demodulated from the PDCCH and the uplink DCI is demodulated from the enhanced PDCCH. As for the enhanced PDCCH, when a plurality of DCI formats of the same bit size are arranged in the first-half slot or the second-half slot, the DCI formats of the same bit size are demodulated at the same time by one blind decoding.

The downlink shared data modulation section 406a acquires user data and higher control information based on downlink shared data channel control information input from the downlink shared data channel control information demodulation section 405c. The PRB positions (VRB positions) where the enhanced PDCCH can be mapped included in the higher control information are output to the downlink shared data channel control information demodulation section 405c. The downlink shared channel data demodulation section 406b demodulates downlink shared channel data based on uplink shared data channel control information that is input from the uplink shared data channel control information demodulation section 405b.

The channel estimation section 407 performs channel estimation using a user-specific reference signal (DM-RS) or a cell-specific reference signal (CRS). When demodulating the normal PDCCH and the enhanced PDCCH "with cross interleaving," channel estimation is performed using a cell-specific reference signal. On the other hand, when demodulating the enhanced PDCCH and user data "without cross interleaving," channel estimation is performed using the DM-RS and CRS. The estimated channel variation is output to the shared control channel control information demodulation section 405a, the uplink shared data channel control information demodulation section 405b, the downlink shared data channel control information demodulation section 405c and the downlink shared data demodulation section 406a. In these demodulation sections, demodulation processes are performed using the estimated channel variation and demodulation reference signal.

The baseband signal processing section 104 has, as function blocks of the transmission processing system, a data generating section 411, a channel coding section 412, a modulation section 413, a DFT section 414, a mapping section 415, an IFFT section 416, and an CP inserting section 417. The data generating section 411 generates transmission data from bit data that is received as input from the application section 105. The channel coding section 412 applies channel coding processes such as error correction to the transmission data, and the modulation section 413 modulates the transmission data having been subjected to channel coding by QPSK and so on.

The DFT section 414 performs a discrete Fourier transform on the modulated transmission data. The mapping section 415 maps the frequency components of the data symbol after the DFT, to the subcarrier positions designated by the base station apparatus 20. The IFFT section 416 converts the input data to match the system band into time sequence data by performing an inverse fast Fourier transform, and the CP inserting section 417 inserts cyclic prefixes in the time sequence data in data units.

The present invention is by no means limited to the above embodiments and can be implemented in various modifications. Regarding the sizes and shapes illustrated in the accompanying drawings in relationship to the above embodiments, these are by no means limiting, and can be changed as appropriate within a range the effect of the present invention is sufficiently provided. Besides, the present invention can be implemented with various changes, without departing from the scope of the present invention.

The disclosure of Japanese Patent Application No. 2011-103223, filed on May 2, 2011, including the specification, drawings and abstract, is incorporated herein by reference in its entirety.

The invention claimed is:

1. A radio base station apparatus comprising:
   a signal generator that generates a first downlink control signal to be transmitted to a mobile terminal apparatus by a physical downlink control channel and a second downlink control signal to be transmitted to the mobile terminal apparatus by an enhanced physical downlink control channel;
   a control channel multiplexer that multiplexes the first downlink control signal on a radio resource of first n symbols (n=1, 2, or 3) allocated to the physical downlink control channel in a subframe and frequency-division-multiplexes the second downlink control signal on a radio resource which is allocated to the enhanced physical downlink control channel and has predetermined symbols in a time domain following the symbols where the first downlink control signal is multiplexed in the subframe;
   a transmitter that transmits the first downlink control signal by the physical downlink control channel and the second downlink control signal by the enhanced physical downlink control channel; and
   a scheduler that controls an aggregation level of control channel elements to allocate to the physical downlink control channel for the first downlink control signal and controls an aggregation level of control channel elements to allocate to the enhanced physical downlink control channel for the second downlink control signal,
wherein aggregation levels configurable for the physical downlink control channel or the enhanced physical downlink control channel are limited to make some of the aggregation levels configurable for one of the physical downlink control channel and the enhanced physical downlink control channel and unconfigurable for the other.

2. The radio base station apparatus according to claim 1, wherein a format type for each of a first-half slot and a second-half slot of the radio resource to which the enhanced physical downlink control channel is allocated is limited such that a plurality of DCI formats of a same bit size are arranged in at least one of the first-half slot and the second-half slot.

3. The radio base station apparatus according to claim 1, wherein DCI (Downlink Control Information) formats applicable to the first downlink control signal and the second downlink control signal are limited to make some of the DCI formats applicable to one of the first downlink control signal and the second downlink control signal and unapplicable to the other.

4. The radio base station apparatus according to claim 3, wherein the first downlink control signal is limited to a DCI format for downlink scheduling assignment and the second downlink control signal is limited to a DCI format for an uplink grant.

5. The radio base station apparatus according to claim 4, wherein the radio base station apparatus notifies the mobile terminal apparatus of information about limits for the DCI formats applied to the first downlink control signal and the second downlink control signal by higher layer signaling.

6. A mobile terminal apparatus comprising:
a receiver that receives a first downlink control signal that is multiplexed on a radio resource of first n symbols (n=1, 2, or 3) allocated to a physical downlink control channel in a subframe and a second downlink control signal that is frequency-division-multiplexed on radio resource which is allocated to an enhanced physical downlink control channel and has predetermined symbols in a time domain following the symbols where the first downlink control signal is multiplexed in the subframe; and
a demodulator that performs blind decoding on the first downlink control signal multiplexed on the radio resource allocated to the physical downlink control channel by a configured aggregation level to detect the first downlink control channel and to perform blind decoding on the second downlink control signal multiplexed on the radio resource allocated to the enhanced physical downlink control channel by a configured aggregation level to detect the second downlink control channel, aggregation levels configurable for the physical downlink control channel or the enhanced physical downlink control channel being limited, to make some of the aggregation levels configurable for one of the physical downlink control channel and the enhanced physical downlink control channel and unconfigurable for the other.

7. The mobile terminal apparatus according to claim 6, wherein:
DCI (Downlink Control Information) formats applicable to the first downlink control signal and the second downlink control signal are limited to make some of the DCI formats applicable to one of the first downlink control signal and the second downlink control signal and unapplicable to the other, and
the demodulator decodes the first downlink control signal limited to a DCI format for downlink scheduling assignment earlier in time, and, after that, decodes the second downlink control signal limited to a DCI format for an uplink grant.

8. The mobile terminal apparatus according to claim 6, wherein:
the receiver receives the second downlink control signal of which a format type is limited such that a plurality of DCI formats of a same bit size are arranged in at least either of a first-half slot and a second-half slot of the radio resource to which the enhanced physical downlink control channel is allocated; and
the demodulator performs blind decoding of the plurality of DCI formats of the same bit size in at least either of the first-half slot and the second-half slot in one time.

9. A radio communication system in which a first downlink control signal, a second downlink control signal and a downlink data signal generated in a radio base station apparatus are transmitted to a mobile terminal apparatus, and, the first and second downlink control signals are demodulated in the mobile terminal apparatus,
the radio base station apparatus comprising:
a signal generator that generates the first downlink control signal to be transmitted to the mobile terminal apparatus by a physical downlink control channel and the second downlink control signal to be transmitted to the mobile terminal apparatus by an enhanced physical downlink control channel;
a control channel multiplexer that multiplexes the first downlink control signal on a radio resource of first n symbols (n=1, 2, or 3) allocated to the physical downlink control channel in a subframe and
frequency-division-multiplexes the second downlink control signal on a radio resource which is allocated to the enhanced physical downlink control channel and has predetermined symbols in a time domain following the symbols where the first downlink control signal is multiplexed in the subframe;
a transmitter that transmits the first downlink control signal by the physical downlink control channel and the second downlink control signal by the enhanced physical downlink control channel; and; and
a scheduler that controls an aggregation level of control channel elements to allocate to the physical downlink control channel for the first downlink control signal and controls an aggregation level of control channel elements to allocate to the enhanced physical downlink control channel for the second downlink control signal,
wherein aggregation levels configurable for the physical downlink control channel or the enhanced physical downlink control channel are limited to make some of the aggregation levels configurable for one of the physical downlink control channel and the enhanced physical downlink control channel and unconfigurable for the other; and
the mobile terminal apparatus comprising:
a receiver that receives the first downlink control signal that is multiplexed on a radio resource of first n symbols (n=1, 2, or 3) allocated to the physical downlink control channel in a subframe and the second downlink control signal that is frequency-division-multiplexed on radio resource which is allocated to the enhanced physical downlink control channel and has predetermined symbols in a time domain following the symbols where the first downlink control signal is multiplexed in the subframe; and a demodulator that performs blind decoding on the first downlink control signal multiplexed on the radio resource allocated to the physical downlink control channel by a configured aggregation level to detect the first downlink control channel and to perform blind decoding on the second downlink control signal multiplexed on the radio resource allocated to the enhanced physical downlink control channel by a configured aggregation level to detect the second downlink control channel, aggregation levels configurable for the physical downlink control channel or the enhanced physical downlink control channel being limited, to make some of the aggregation levels configurable for one of the physical downlink control channel and the enhanced physical downlink control channel and unconfigurable for the other.

10. A radio communication method comprising the steps of:

generating a first downlink control signal to be transmitted to a mobile terminal apparatus by a physical downlink control channel and a second downlink control signal to be transmitted to the mobile terminal apparatus by an enhanced physical downlink control channel;

multiplexing the first downlink control signal on a radio resource of first n symbols (n=1, 2, or 3) allocated to the physical downlink control channel in a subframe and frequency-division-multiplexing the second downlink control signal on a radio resource which is allocated to the enhanced physical downlink control channel and has predetermined symbols in a time domain following the symbols where the first downlink control signal is multiplexed in the subframe;

transmitting the first downlink control signal by the physical downlink control channel and the second downlink control signal by the enhanced physical downlink control channel; and controlling an aggregation level of control channel elements to allocate to the physical downlink control channel for the first downlink control signal and controlling an aggregation level of control channel elements to allocate to the enhanced physical downlink control channel for the second downlink control signal, wherein aggregation levels configurable for the physical downlink control channel or the enhanced physical downlink control channel are limited to make some of the aggregation levels configurable for one of the physical downlink control channel and the enhanced physical downlink control channel and unconfigurable for the other.

11. A radio communication method comprising the steps of:

receiving a first downlink control signal that is multiplexed on a radio resource of first n symbols (n=1, 2, or 3) allocated to a physical downlink control channel in a subframe and a second downlink control signal that is frequency-division-multiplexed on a radio resource which is allocated to an enhanced physical downlink control channel and has predetermined symbols in a time domain following the symbols where the first downlink control signal is multiplexed in the subframe;

performing blind decoding on the first downlink control signal multiplexed on the radio resource allocated to the physical downlink control channel by a configured aggregation level to detect the first downlink control channel and performing blind decoding on the second downlink control signal multiplexed on the radio resource allocated to the enhanced physical downlink control channel by a configured aggregation level to detect the second downlink control channel, aggregation levels configurable for the physical downlink control channel or the enhanced physical downlink control channel being limited to make some of the aggregation levels configurable for one of the physical downlink control channel and the enhanced physical downlink control channel and unconfigurable for the other.

* * * * *